United States Patent Office 3,248,341
Patented Apr. 26, 1966

3,248,341
METHOD OF ADMIXING A PHOSPHORIC ACID AND AN ABSORBENT AND PRECIPITATING WITH AMMONIA
James J. Louvar, Riverside, Ill., assignor to Universal Oil Products Company, Des Plaines, Ill., a corporation of Delaware
No Drawing. Filed Feb. 13, 1963, Ser. No. 259,377
2 Claims. (Cl. 252—435)

This invention relates to a process for preparing an improved hydrocarbon conversion catalyst. More specifically, the invention is concerned with a process for preparing an improved polymerization catalyst.

Heretofore, conventional hydrocarbon conversion catalysts and specifically polymerization catalysts have been prepared by admixing an oxygen acid of phosphorous with a solid adsorbent, drying and calcining the resultant mixture to thus form a solid catalyst. In addition, the prior art has also disclosed solid catalysts of this type which contain materials other than just the oxygen acid of phosphorous and the solid adsorbent, examples of such catalysts including metals such as nickel, zirconium, manganese, cobalt or salts thereof, carbonaceous materials including charcoal, activated charcoal, lamp black, graphite, coke, powdered coal, etc. However, it has now been discovered that when a solid siliceous adsorbent is acidified with an oxygen acid of phosphorous and the resulting mixture is precipitated by the addition of ammonia followed by removal of the ammonia, a polymerization catalyst will result which possesses a relatively high degree of activity while maintaining other desirable properties such as stability in service and relatively low corrosive properties when employed in ordinarily commercial apparatus comprising various types of steel.

It is therefore an object of this invention to provide a process for preparing a hydrocarbon conversion catalyst which possesses a high degree of conversion activity.

Another object of this invention is to provide a process for preparing a high active catalyst which is suitable for use in the polymerization of olefinic hydrocarbons.

Taken in its broadest aspect one embodiment of this invention resides in a process for the production of a polymerization catalyst which comprises admixing an oxygen acid of phosphorous with a solid adsorbent, precipitating the resultant mixture with ammonia, filtering and drying the precipitate, thereafter calcining the dried precipitate, and recovering the desired polymerization catalyst.

A further embodiment of this invention is found in a process for the production of a polymerization catalyst which comprises admixing an oxygen acid of phosphorous with a solid siliceous adsorbent, precipitating the resultant mixture with concentrated ammonia, filtering and drying the precipitate at a temperature in the range of from about 350° to about 400° F., thereafter calcining the dried precipitate at a temperature in the range of from about 680° to about 1200° F., and recovering the desired polymerization catalyst.

A specific embodiment of this invention is found in a process for the production of a polymerization catalyst which comprises admixing from about 60% to about 80% by weight of polyphosphoric acid with from about 20% to about 40% by weight of silica sol, precipitating the resultant mixture with concentrated ammonia, filtering and drying the precipitate at a temperature in the range of from about 350° to about 400° F., thereafter calcining the dried precipitate at a temperature in the range of from about 680° to about 1200° F., for a period of from about 1 to about 8 hours, and recovering the desired polymerization catalyst.

Other objects and embodiments will be found in the following further detailed description of this invention.

The essential and active ingredient of the solid catalysts which are manufactured by the present process for use in organic reactions is an acid of phosphorous, preferably one in which the phosphorous has a valence of 5. The acid may constitute 60% to about 80% or more of the catalyst mixture ultimately produced, and in most cases is over 50% by weight thereof. Of the various acids of phosphorous, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorous insofar as they are adaptable. It is not intended to infer, however, that the different acids of phosphorous, which may be employed will produce catalysts which have identical effects upon any given organic reactions as each of the catalysts produced from different acids and by slightly varied procedure will exert its own characteristic action.

In using orthophosphoric acid as a primary ingredient, different concentrations of the aqueous solution may be employed from approximately 75% to 100% or acid containing some free phosphorous pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with adsorbent materials. In practice it has been found that pyrophosphoric acid corresponding to the formula $H_4P_2O_7$ can be incorporated with siliceous adsorbents at temperatures somewhat above its melting point (142° F.) and that the period of heating which is given to the pyro acid-adsorbent mixtures may be different from that used when the ortho acid is so employed.

Triphosphoric acid which may be represented by the formula $H_5P_3O_{10}$ may also be used as a starting material for preparation of the catalysts of this invention. These catalytic compositions may also be prepared from the siliceous materials mentioned herein and phosphoric acid mixture containing orthophosphoric, pyrophosphoric, triphosphoric, and other polyphosphoric acids.

Another acid of phosphorous which may be employed in the manufacture of composite catalysts according to the present invention is tetraphosphoric acid. It has the general formula $H_6P_4O_{13}$ which corresponds to the double oxide formula $3H_2O \cdot 2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520% by weight of the total water present. After a considerable period of standing at ordinary temperatures, the crystals of the tetraphosphoric acid separate from the viscous liquid and it is found that these crystals melt at approximately 93° F. and have a specific gravity of 1.1886 at a temperature of 60° F. However, it is unnecessary to crystallize the tetraphosphoric acid before employing it in the preparation of the solid catalyst inasmuch as the crude tetraphosphoric acid mixture may be incorporated with the siliceous adsorbent and other catalyst ingredient.

The materials which may be employed as adsorbents or carriers for acids of phosphorous are divided roughly into two classes. The first class comprises materials of predominantly siliceous character, and includes diatomaceous earth, kieselguhr, and artificially prepared porous silica. The second class of materials which may be employed either alone or in conjunction with the first class comprises generally certain members of the class of aluminum silicates and includes such naturally occurring substances as various fuller's earths and clays such as bentonite, montmorillonite, acid treated clays and the like. Each adsorbent or supporting material which may be used will exert its own specific influence upon the net effectiveness of the catalyst composite which will not necessarily be identical with that of the other members of the class. For purposes of this invention the term "solid adsorbent" as used in the specification and appended claims, will also refer to silica sol which is a colloidal dispersion of solid particles in a homogeneous liquid media.

The catalysts of the present invention are prepared by admixing an oxygen acid of phosphorous of the type hereinbefore set forth with the solid siliceous adsorbent also of the type hereinbefore set forth in a ratio of from about 60% to about 80% by weight of the phosphoric acid with from about 20% to about 40% by weight of the siliceous adsorbent. The resulting solution is then subjected to the action of concentrated ammonia which precipitates out the desired composite. This composite is then dried at a temperature in the range of from about 350° to about 400° F. for a period of time from about 1 to about 4 hours. Following this the dried precipitate is then formed into the desired shape, one such process being to extrude the composite through dies and thereafter cutting the extruded particles to form pills. The resultant pills are then subjected to calcination in a stream of air at temperatures ranging from about 680° to about 1200° F. for a period of time ranging from about 1 to about 8 hours. The calcination of the extruded and formed particles in a stream of air or nitrogen will remove the ammonia which may still be present in the catalyst and will thereafter permit the recovery of the desired solid phosphoric acid polymerization catalyst.

The resultant catalyst which has been calcined is active for polymerizing olefinic hydrocarbons particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a granular layer in a heated reactor which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions suitable for maintaining liquid phase operation during polymerization of olefinic hydrocarbons, such as butylenes, to produce gasoline fractions. When employed in the polymerization of normally gaseous olefins, the formed and calcined catalyst particles are generally placed in a vertical, cylindrical treating tower and the olefin-containing gas mixture is passed downwardly therethrough at a temperature of from about 350° to about 550° F. and at a pressure of 100 to about 1500 pounds per square inch. These conditions are particularly applicable when dealing with olefin-containing material such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involved mixed polymerization at temperatures of from approximately 250° to about 325° F. and at pressures of from about 500 to about 1500 pounds per square inch.

In utilizing the catalysts of this invention for promoting miscellaneous organic reactions, the catalysts may be employed in essentially the same way as they are used when polymerizing olefins in case the reactions are essentially vapor phase and they also may be employed in suspension in liquid phase in various types of equipment.

It is also contemplated within the scope of this invention that with suitable modifications in the details of operation, the present type of catalyst may be employed in a large number of organic reactions including polymerization of olefins as hereinbefore set forth. Typical cases of reactions in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydrohalogenation of unsaturated organic compounds, isomerization reactions, ester formation by the interaction of carboxylic acids and olefins, and the like. The specific procedure for utilizing the present type of catalyst in miscellaneous organic reactions will be determined by the chemical and physical characteristics and the phase of the reacting constituents.

During the use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst, an amount of water or water vapor such as steam is added to the charged olefin-containing gas so as to substantially balance the vapor pressure of the catalyst. This amount of water vapor varies from about 0.1 to about 6% by volume of the organic material charged.

The following examples are given to illustrate the process of the present invention which, however, are not intended to limit the generally broad scope of the present invention in strict accordance therewith.

*Example I*

A solid catalyst was formed by diluting 162 grams of 86% phosphoric acid with water and cooling the resultant mixture in an ice bath. Following this 86 grams of a silica sol was diluted with 100 cc. of water and added to the acid with stirring. The resulting mixture was heated on a steam bath for a period of 2 hours following which said mixture was cooled and precipitated by the addition of 700 grams of concentrated aqueous ammonia. The precipitate was filtered and dried at a temperature of about 390° F. for a period of about 2 hours. The dried precipitate was then pilled into ¼" pills and slowly calcined in a nitrogen gas stream at a temperature of about 1100° F. for a period of about 6 hours.

The catalytic activity of the catalyst was determined by placing 10 grams of the catalyst in a rotating autoclave and contacting the pills with 100 grams of a 50/50 propane-propylene mixture, said autoclave being maintained at a temperature of about 450° F. and a pressure of 600 pounds per square inch. At the end of this time the reaction product was recovered, and there was found an 85% conversion of propylene to polymer.

*Example II*

In this example a conventional solid phosphoric acid catalyst was prepared by compositing polyphosphoric acid with a siliceous adsorbent, the resulting composite was dried at a temperature of about 390° F. The dried composite was then extruded and pelleted to form ¼" pills and thereafter calcined at a temperature of about 1100° F. for a period of 6 hours.

The catalyst which was prepared according to the above paragraph was then placed in a rotating autoclave and subjected to the action of 100 grams of a 50/50 propane-propylene mixture at a temperature of about 450° F. and a pressure of about 600 pounds per square inch for a period of about 2 hours. At the end of this time the reaction product was recovered, the conversion of propylene being calculated by comparing the propylene content of the exit gaseous products with that of the feed stock, said conversion being about 55%.

*Example III*

A solid catalyst is formed by diluting orthophosphoric acid with water and cooling the resultant mixture in an ice bath. The acid is treated with a suspension of diatomaceous earth also diluted with water, said diatomaceous earth being added to the acid with constant stirring. The resultant mixture is heated on a steam both for a period of about 2 hours and treated by the addition of concentrated aqueous ammonia to give a filterable gel. The precipitated gel is filtered and dried at a temperature of about 390° F. for a period of about 2 hours. The dried precipitate is then extruded and formed into ¼" pills. Following this the dried pills are calcined in a nitrogen gas stream at a temperature of about 1100° F. for a period of about 6 hours to yield a polymerization catalyst.

Ten grams of the catalyst prepared in the above paragraph is placed in a rotating autoclave and contacted with 100 grams of a 50/50 propane-propylene mixture at a temperature of about 450° F. and a pressure of about 600 pounds per square inch for a period of about 2 hours. The polymerized product is then recovered and will be found to contain a relatively high amount of propylene polymer.

I claim as my invention:

1. A process for the production of a polymerization catalyst which comprises forming a precipitate by adding ammonia to an admixture containing from about 60 to about 80% by weight of an oxygen acid of phosphorus and about 20 to about 40% by weight of silica sol, filtering and drying the precipitate at a temperature in the range of from about 350° to about 400° F., thereafter calcining the dried precipitate at a temperature in the range of from about 680° to about 1200° F. until substantially all ammonia is removed therefrom, and recovering the desired ammonia-free polymerization catalyst.

2. A process for the production of a polymerization catalyst which comprises forming a precipitate by adding ammonia to an admixture containing from about 60% to about 80% by weight of polyphosphoric acid and from about 20% to about 40% by weight of silica sol, filtering and drying the precipitate at a temperature in the range of from about 350° to about 400° F., thereafter calcining the dried precipitate at a temperature in the range of from about 680° to about 1200° F. for a period of from about 1 to about 8 hours until substantially all ammonia is removed therefrom, and recovering the desired ammonia-free polymerization catalyst.

References Cited by the Examiner

UNITED STATES PATENTS

| | | | |
|---|---|---|---|
| 1,939,647 | 12/1933 | Arnold et al. | 252—437 |
| 2,270,044 | 1/1942 | Fulton et al. | 252—437 |
| 2,300,123 | 10/1942 | Keunecke et al. | 252—437 |
| 2,470,203 | 5/1949 | Wickenden | 252—437 |
| 2,496,621 | 2/1950 | Deery | 252—437 |
| 2,507,625 | 5/1950 | Ehrhardt | 252—437 |
| 2,537,282 | 1/1951 | Schaad | 252—437 |
| 2,933,543 | 4/1960 | Ambridge et al. | 252—437 |
| 2,938,874 | 5/1960 | Rosinski | 252—437 |

OTHER REFERENCES

Techniques of Catalyst Preparation, Symposium sponsored by Division of Petroleum Chemistry of the American Chemical Society, April 8–13, 1956, pages 6–8.

BENJAMIN HENKIN, *Primary Examiner*.

MAURICE A. BRINDISI, *Examiner*.